(12) United States Patent
Ihnfeldt et al.

(10) Patent No.: US 11,225,703 B2
(45) Date of Patent: Jan. 18, 2022

(54) MAGNETOCALORIC ALLOYS USEFUL FOR MAGNETIC REFRIGERATION APPLICATIONS

(71) Applicants: General Engineering & Research, L.L.C., San Diego, CA (US); The Regents of the University of California, Oakland, CA (US)

(72) Inventors: Robin Ihnfeldt, San Diego, CA (US); Sungho Jin, San Diego, CA (US); Renkun Chen, San Diego, CA (US); Xia Xu, San Diego, CA (US); Elizabeth Caldwell, San Diego, CA (US); Eunjeong Kim, San Diego, CA (US)

(73) Assignees: General Engineering & Research, L.L.C., San Diego, CA (US); The Regents of The University of California, Oakland, CA (US)

( * ) Notice: Subject to any disclaimer, the term of this patent is extended or adjusted under 35 U.S.C. 154(b) by 313 days.

(21) Appl. No.: 16/476,047

(22) PCT Filed: Jan. 8, 2018

(86) PCT No.: PCT/US2018/012836
§ 371 (c)(1),
(2) Date: Jul. 3, 2019

(87) PCT Pub. No.: WO2018/129476
PCT Pub. Date: Jul. 12, 2018

(65) Prior Publication Data
US 2019/0352747 A1 Nov. 21, 2019

Related U.S. Application Data

(60) Provisional application No. 62/443,955, filed on Jan. 9, 2017, provisional application No. 62/481,385, filed on Apr. 4, 2017.

(51) Int. Cl.
*F25B 21/00* (2006.01)
*C22C 28/00* (2006.01)
(Continued)

(52) U.S. Cl.
CPC .............. *C22C 28/00* (2013.01); *B22D 7/005* (2013.01); *C22F 1/16* (2013.01); *F25B 21/00* (2013.01);
(Continued)

(58) Field of Classification Search
None
See application file for complete search history.

(56) References Cited

U.S. PATENT DOCUMENTS 6,022,486 A    2/2000  Tokai et al.
2014/0290274 A1  10/2014  Hu et al.

FOREIGN PATENT DOCUMENTS

JP    S62-30840 A    2/1987

OTHER PUBLICATIONS

Zhang, (Physica B, 2015, vol. 456, p. 258-260) . (Year: 2015).*
(Continued)

*Primary Examiner* — Xiaowei Su
(74) *Attorney, Agent, or Firm* — Knobbe, Martens, Olson & Bear, LLP

(57) ABSTRACT

This invention relates to magnetocaloric materials comprising ternary alloys useful for magnetic refrigeration applications. The disclosed ternary alloys are Cerium, Neodymium, and/or Gadolinium based compositions that are fairly inexpensive, and in some cases exhibit only $2^{nd}$ order magnetic phase transitions near their curie temperature, thus there are no thermal and structural hysteresis losses. This makes these compositions attractive candidates for use in magnetic refrigeration applications. The performance of the disclosed
(Continued)

materials is similar or better to many of the known expensive rare-earth based magnetocaloric materials.

5 Claims, 10 Drawing Sheets

(51) Int. Cl.
    *B22D 7/00*     (2006.01)
    *C22F 1/16*     (2006.01)
    *H01F 1/01*     (2006.01)

(52) U.S. Cl.
    CPC ......... *H01F 1/015* (2013.01); *C22C 2202/02* (2013.01); *F25B 2321/002* (2013.01)

(56) References Cited

OTHER PUBLICATIONS

Wang, (J Alloys and Compounds, 2014, vol. 587, p. 10-13). (Year: 2014).*

Chiriac, H. et al., "Structure and Magnetic Properties of Some Bulk Amorphous Materials," Journal of Non-Crystalline Solids, 1999, vol. 250-252, part 2, pp. 751-756, published Aug. 1, 1999.

Gupta, S. et al., "Review on Magnetic and Related Properties of RTX Compounds," Journal of Alloys and Compounds, 2015, vol. 618, pp. 562-606, published Jan. 5, 2015.

Hu, Z. et al., "Magnetocaloric Effects in RTZ Intermetallic Compounds (R=Gd—Tm, T=Fe—Cu and Pd, X=AL and Si)," Chinese Physics B, 2015, vol. 24, No. 12, published Nov. 10, 2015.

Kowalczyk, A. et al., "Magnetic, Transport and Thermodynamic Properties of $Ce_5Ni_2Si_3$ Compound," Solid State Sciences, 2012, vol. 14, issue 10, pp. 1496-1502, published online Sep. 5, 2012.

Search Report and Written Opinion received in International Application No. PCT/US2018/012836, dated Jul. 12, 2018, in 17 pages.

Plaza, E. et al., "Magnetocaloric effect: Overcoming the magnetic limit," Journal of Magnetism and Magnetic Materials, 2009, vol. 321, pp. 446-449, published Mar. 2009.

Shen, B. et al., "Recent Progress in Exploring Magnetocaloric Materials," Advanced Materials, 2009, vol. 21, pp. 4545-4564, published Dec. 3, 2009.

Kamiya, K. et al., "Hydrogen Liquefaction by Magnetic Refrigeration," Cryocoolers, 2007, vol. 14, pp. 637-644, published Jun. 2006.

Provenzano, V. et al., "Reduction of Hysteresis Losses in Magnetic Regrigerant Gd5Ge2Si2 by the Addition of Iron," Nature, 2004, vol. 429, pp. 853-857, published Aug. 12, 2004.

Yang, H. et al., "Synthesis and Magnetocaloric Properties of La0.7Ca0.3MnO3 Nanoparticles With Different Sizes," Journal of Alloys and Compounds, 2013, vol. 555, pp. 150-155, published Apr. 5, 2013.

* cited by examiner

MAGNETOCALORIC ALLOYS USEFUL FOR MAGNETIC REFRIGERATION APPLICATIONS

CROSS-REFERENCE TO RELATED APPLICATIONS

This application claims priority to International Application No. PCT/US2018/012836 filed on Jan. 8, 2018 entitled "Magnetocaloric Alloys Useful for Magnetic Refrigeration Applications," which claims priority to U.S. Provisional Patent Application No. 62/443,955 filed on Jan. 9, 2017 entitled "Magnetocaloric Alloys Useful for Magnetic Refrigeration Applications", and U.S. Provisional Patent Application No. 62/481,385 filed on Apr. 4, 2017 entitled "Magnetocaloric Alloys Useful for Magnetic Refrigeration Applications", the contents of which are incorporated herein by reference in their entirety.

BACKGROUND

Field

Embodiments of the present invention generally relate to magnetocaloric materials comprising ternary alloys useful for magnetic refrigeration applications. In some embodiments, the disclosed alloys exhibit only $2^{nd}$ order magnetic phase transitions, with no thermal or structural hysteresis losses. This makes them attractive candidates for use in magnetic refrigeration applications. Additionally, the disclosed compositions are lower cost and higher performance than prior art materials.

Description of the Related Art

Magnetic Refrigeration utilizes the magnetocaloric effect (MCE), which is the temperature variation of a magnetic material after exposure to a magnetic field. A more detailed description of the magnetocaloric effect is described by Plaza and Campoy, *J. of Magnetism and Magnetic Mat.*, 321, 446 (2009). A critical challenge of developing low cost magnetic refrigerators is the cost and availability of MCE materials, which are typically rare-earth and very expensive. The magnetocaloric effect (MCE) is an intrinsic property of a magnetic solid which has been successfully utilized for a variety of applications. The thermal response of the MCE material to the application or removal of a magnetic field is typically maximized when the material is near its magnetic ordering temperature. Thus, the materials considered for magnetic refrigeration devices must exhibit a magnetic phase transition temperature near the temperature region of interest, i.e. for hydrogen liquefaction ~20K, for nitrogen liquefaction ~80K, etc. Some of the most common MCE materials include $RNi_2$ (R=Gd, Dy and Ho) and $RAl_2$ (R=Er, Ho, Dy and $Dy_{0.5}Ho_{0.5}$, $Dy_xEr_{1-x}$ and GdPd), all of which are rare-earth and expensive, according to B. G. Shen, J. R. Sun, F. X. Hu, H. W. Zhang, and Z. H. Cheng, *Adv. Mater.*, 21, 4545 (2009). Kamiya et al., *Cryocoolers*, 14, 637 (2007), successfully demonstrated a small scale hydrogen liquefaction magnetic refrigerator with efficiency approaching 90% of the Carnot efficiency, however, 280 g of the rare-earth MCE material, dysprosium (bulk price ~$350/kg for 99% purity) gadolinium (bulk price ~$55/kg for 99.9% purity) aluminum garnet, was needed to achieve a maximum cooling power of 14.6 W. These starting materials must further undergo significant processing to obtain the desired MCE properties which can increase the materials cost by 10-100X. Clearly, the capital cost of a magnetic refrigeration system capable of >400 W of cooling power using the traditional rare-earth based MCE materials would far exceed its economic feasibility.

One of the major hurdles inhibiting the development of magnetic refrigeration technologies is the lack of commercially available low cost magnetocaloric materials that will actually function, for a long period of time, in a magnetic refrigeration environment such as the active magnetic regenerator (AMR) which is in development by several entities. While there has been extensive research discovering new materials with magnetocaloric properties, the majority of these material compositions will require substantial engineering to be compatible with AMR technologies. Materials such as GdSiGe or LaFeSi based alloys have sparked interest due to their giant magnetocaloric effect, however, this effect is due to a first order phase transition which has significant magnetic and thermal hysteresis and also exhibits structural changes, as described by Shen, J. R Sun, F. X. Hu, H. W. Zhang, and Z. H. Cheng, Adv. Mater., 21, 4545, 2009 and V. Provenzano, A. J. Shapiro, and R. D. Shull, Nature, 429, 853, 2004. The hysteresis reduces the reversibility of the MCE such that during high frequency magnetization and demagnetization, which is required for high efficiency AMRs, the magnitude of the MCE is drastically reduced. Methods to suppress thermal and magnetic hysteresis are possible, but require additional materials and processing and also act to suppress the MCE. Additionally, the structural changes typically manifest as volume expansion and contraction of the material, causing cracking during the magnetization and demagnetization cycles which quickly reduces the MCE response and lowers the thermal conductivity, making these materials incompatible in AMRs. While methods to improve mechanical stability of MCE materials with first order transitions can be employed, this will also require significant additional materials and processing which will increase cost. Further, scalable manufacturing of many MCE materials has yet to be demonstrated.

Literature has also suggested the microstructure of MCE materials can significantly influence its MCE properties. Micro- or nano-sized material synthesis occurs in either a top-down approach, which involves the breaking down of the bulk material into nano-sized structures or particles, or a bottom-up approach which refers to the building up of a material atom-by-atom, or molecule-by-molecule. Yang et al., *Journal of Alloys and Compounds*, 555, 150 (2013), chemically synthesized (bottom-up approach) LaCaMnO nanoparticles and showed that variation in particle size shifted the MCE response temperature and also broadened the response temperature range compared to the bulk material. However, nanomaterial synthesis of the more common MCE alloys is extremely difficult. Using the top-down approach, surface oxidation which has minimal effect on bulk materials, is extremely rapid with the large surface area of nano-grains, and the MCE response of most alloys will be significantly reduced with even the slightest presence of oxygen. US Patent Application No. 2014/0290274 discloses LaFeSi based MCE materials with grain sizes of 15 um-800 um, where the micron sized grains were produced using ball milling techniques. The authors report an increase in magnetization response as the particle size decreases, with an optimal particle size in the range of 15 um-200 um. Particle sizes less than 10 um showed drastically reduced MCE response which may be due to the surface oxidation of these smaller particles which is difficult to eliminate using traditional ball milling techniques. On the other hand, bottom-up approaches for metal alloys allow for enhanced control of particle size but are still under development, with oxidation, as well as obtaining the necessary crystalline structure presenting significant challenges.

SUMMARY

Some embodiments of the present invention provide a magnetocaloric material comprising $(Ce_xNd_{1-x})Si$ wherein x is in the range of about 0.1 to about 0.9. In some embodiments, the magnetocaloric material exhibits a $2^{nd}$ order magnetic phase transition in the temperature range of about 10K to about 42K. In some embodiments, the magnetocaloric material is $Ce_{0.1}Nd_{0.9}Si_{1.0}$, $Ce_{0.2}Nd_{0.8}Si_{1.0}$, $Ce_{0.3}Nd_{0.7}Si_{1.0}$, $Ce_{0.4}Nd_{0.6}Si_{1.0}$, $Ce_{0.5}Nd_{0.5}Si_{1.0}$, $Ce_{0.6}Nd_{0.4}Si_{1.0}$, $Ce_{0.7}Nd_{0.3}Si_{1.0}$, $Ce_{0.8}Nd_{0.2}Si_{1.0}$, $Ce_{0.9}Nd_{0.1}Si_{1.0}$, or any combination thereof.

Some embodiments of the present invention provide a magnetocaloric material comprising RE $(Si_y A_{1-y})$ wherein RE is selected from the group consisting of Ce, Nd, or Gd, and wherein A is selected from the group consisting of Sn, Co, Al, Ni, Fe, Mn, Zn, or Cu, and wherein y is in the range of about 0.1 to about 0.9. In some embodiments the material is $Ce_{1.0}Si_{0.9}Sn_{0.1}$, $Ce_{1.0}Si_{0.8}Sn_{0.8}$, $Ce_{1.0}Si_{0.7}Sn_{0.3}$, $Ce_{1.0}Si_{0.6}Sn_{0.4}$, $Ce_{1.0}Si_{0.5}Sn_{0.5}$, $Ce_{1.0}Si_{0.4}Sn_{0.6}$, $Ce_{1.0}Si_{0.3}Sn_{0.7}$, $Ce_{1.0}Si_{0.2}Sn_{0.8}$, $Ce_{1.0}Si_{0.1}Sn_{0.9}$, or any combination thereof. In some embodiments the material is $Nd_{1.0}Si_{0.9}Mn_{0.1}$, $Nd_{1.0}Si_{0.8}Mn_{0.8}$, $Nd_{1.0}Si_{0.7}Mn_{0.3}$, $Nd_{1.0}Si_{0.6}Mn_{0.4}$, $Nd_{1.0}Si_{0.5}Mn_{0.5}$, $Nd_{1.0}Si_{0.4}Mn_{0.6}$, $Nd_{1.0}Si_{0.3}Mn_{0.7}$, $Nd_{1.0}Si_{0.2}Mn_{0.8}$, $Nd_{1.0}Si_{0.1}Mn_{0.9}$, or any combination thereof. In some embodiments the material is $Gd_{1.0}Si_{0.9}Mn_{0.1}$, $Gd_{1.0}Si_{0.8}Mn_{0.8}$, $Gd_{1.0}Si_{0.7}Mn_{0.3}$, $Gd_{1.0}Si_{0.6}Mn_{0.4}$, $Gd_{1.0}Si_{0.5}Mn_{0.5}$, $Gd_{1.0}Si_{0.4}Mn_{0.6}$, $Gd_{1.0}Si_{0.3}Mn_{0.7}$, $Gd_{1.0}Si_{0.2}Mn_{0.8}$, $Gd_{1.0}Si_{0.1}Mn_{0.9}$, or any combination thereof. In some embodiments the material is $Nd_{1.0}Si_{0.9}Fe_{0.1}$, $Nd_{1.0}Si_{0.8}Fe_{0.8}$, $Nd_{1.0}Si_{0.7}Fe_{0.3}$, $Nd_{1.0}Si_{0.6}Fe_{0.4}$, $Nd_{1.0}Si_{0.5}Fe_{0.5}$, $Nd_{1.0}Si_{0.4}Fe_{0.6}$, $Nd_{1.0}Si_{0.3}Fe_{0.7}$, $Nd_{1.0}Si_{0.2}Fe_{0.8}$, $Nd_{1.0}Si_{0.1}Fe_{0.9}$, or any combination thereof. In some embodiments the material is $Gd_{1.0}Si_{0.9}Fe_{0.1}$, $Gd_{1.0}Si_{0.8}Fe_{0.8}$, $Gd_{1.0}Si_{0.7}Fe_{0.3}$, $Gd_{1.0}Si_{0.6}Fe_{0.4}$, $Gd_{1.0}Si_{0.5}Fe_{0.5}$, $Gd_{1.0}Si_{0.4}Fe_{0.6}$, $Gd_{1.0}Si_{0.3}Fe_{0.7}$, $Gd_{1.0}Si_{0.2}Fe_{0.8}$, $Gd_{1.0}Si_{0.1}Fe_{0.9}$, or any combination thereof. In some embodiments the material is $Nd_{1.0}Si_{0.9}Zn_{0.1}$, $Nd_{1.0}Si_{0.8}Zn_{0.8}$, $Nd_{1.0}Si_{0.7}Zn_{0.3}$, $Nd_{1.0}Si_{0.6}Zn_{0.4}$, $Nd_{1.0}Si_{0.5}Zn_{0.5}$, $Nd_{1.0}Si_{0.4}Zn_{0.6}$, $Nd_{1.0}Si_{0.3}Zn_{0.7}$, $Nd_{1.0}Si_{0.2}Zn_{0.8}$, $Nd_{1.0}Si_{0.1}Zn_{0.9}$, or any combination thereof. In some embodiments the material is $Nd_{1.0}Si_{0.9}Ni_{0.1}$, $Nd_{1.0}Si_{0.8}Ni_{0.8}$, $Nd_{1.0}Si_{0.7}Ni_{0.3}$, $Nd_{1.0}Si_{0.6}Ni_{0.4}$, $Nd_{1.0}Si_{0.5}Ni_{0.5}$, $Nd_{1.0}Si_{0.4}Ni_{0.6}$, $Nd_{1.0}Si_{0.3}Ni_{0.7}$, $Nd_{1.0}Si_{0.2}Ni_{0.8}$, $Nd_{1.0}Si_{0.1}Ni_{0.9}$, or any combination thereof. In some embodiments the material is $Nd_{1.0}Si_{0.9}Co_{0.1}$, $Nd_{1.0}Si_{0.8}Co_{0.8}$, $Nd_{1.0}Si_{0.7}Co_{0.3}$, $Nd_{1.0}Si_{0.6}Co_{0.4}$, $Nd_{1.0}Si_{0.5}Co_{0.5}$, $Nd_{1.0}Si_{0.4}Co_{0.6}$, $Nd_{1.0}Si_{0.3}Co_{0.7}$, $Nd_{1.0}Si_{0.2}Co_{0.8}$, $Nd_{1.0}Si_{0.1}Co_{0.9}$, or any combination thereof. In some embodiments the material is $Nd_{1.0}Si_{0.9}Cu_{0.1}$, $Nd_{1.0}Si_{0.8}Cu_{0.8}$, $Nd_{1.0}Si_{0.7}Cu_{0.3}$, $Nd_{1.0}Si_{0.6}Cu_{0.4}$, $Nd_{1.0}Si_{0.5}Cu_{0.5}$, $Nd_{1.0}Si_{0.4}Cu_{0.6}$, $Nd_{1.0}Si_{0.3}Cu_{0.7}$, $Nd_{1.0}Si_{0.2}Cu_{0.8}$, $Nd_{1.0}Si_{0.1}Cu_{0.9}$, or any combination thereof.

In some embodiments, the magnetocaloric material comprises nano-grains, wherein at least one dimension of the nano-grains is in the range of about 0.1 nm to about 1000 nm. In some embodiments of the magnetocaloric material, the at least one dimension of the nanograins is in the range of about 1 nm to about 100 nm. In some embodiments of the magnetocaloric material, the at least one dimension of the nanograins is in the range of about 1 nm to about 50 nm.

Another embodiment of the invention is a magnetic refrigerator comprising the magnetocaloric material. In some embodiments, a magnetic refrigerator comprises a magnetocaloric material, wherein the magnetocaloric material comprises $(Ce_xNd_{1-x})Si$ wherein x is in the range of about 0.1 to about 0.9. In some embodiments, a magnetic refrigerator comprises a magnetocaloric material, wherein the magnetocaloric material comprises RE $(Si_y A_{1-y})$ wherein RE is selected from the group consisting of Ce, Nd, or Gd, and wherein A is selected from the group consisting of Sn, Co, Al, Ni, Fe, Mn, or Cu, and wherein y is in the range of about 0.1 to about 0.9. In some embodiments, a magnetic refrigerator comprises a magnetocaloric material, wherein the magnetocaloric material comprises $Nd_{5.0}$ $(Si_z D_{3-z})$ wherein D is selected from the group consisting of Sn, Co, Al, Ni, Fe, Mn, or Cu, and wherein z is in the range of about 0.1 to about 2.9.

Another embodiment of the invention is a method of manufacturing a heat pump, comprising fabricating at least one part of the heat pump from a magnetocaloric material. In some embodiments, a method of manufacturing a heat pump comprises fabricating at least one part of the heat pump from a magnetocaloric material, wherein the magnetocaloric material comprises $(Ce_xNd_{1-x})Si$ wherein x is in the range of about 0.1 to about 0.9. In some embodiments, a method of manufacturing a heat pump comprises fabricating at least one part of the heat pump from a magnetocaloric material, wherein the magnetocaloric material comprises RE $(Si_y A_{1-y})$ wherein RE is selected from the group consisting of Ce, Nd, or Gd, wherein A is selected from the group consisting of Sn, Co, Al, Ni, Fe, Mn, or Cu, and wherein y is in the range of about 0.1 to about 0.9.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Some embodiments relate to magnetocaloric materials comprising ternary alloys useful for magnetic refrigeration applications. The disclosed ternary alloys are Cerium, Neodymium, and/or Gadolinium based compositions that are fairly inexpensive, and in some cases exhibit only $2^{nd}$ order magnetic phase transitions near their curie temperature, thus there are no thermal and structural hysteresis losses. This makes these compositions attractive candidates for use in magnetic refrigeration applications. Surprisingly, the performance of the disclosed materials is similar or better to many of the known expensive rare-earth based magnetocaloric materials.

Further aspects, features and advantages of this invention will become apparent from the detailed description of the embodiments which follow.

DETAILED DESCRIPTION

Figure 1:
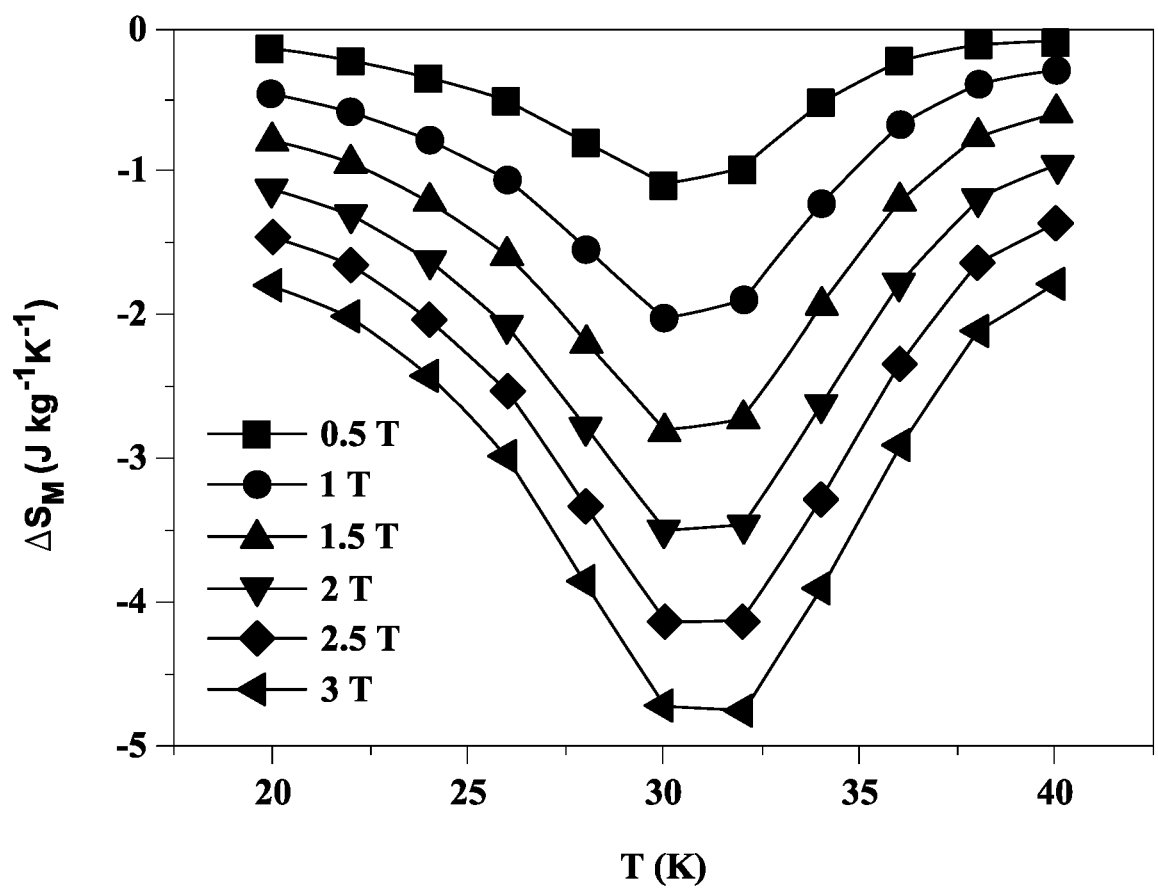
FIG. 1 illustrates the change in entropy versus temperature for a $Ce_{0.5}Nd_{0.5}Si$ alloy.

The magnetocaloric effect (MCE) is a phenomenon in which the temperature change of a suitable material is caused by exposing the material to a changing magnetic field. The magnetocaloric effect can be quantified with the equation below:

$$\Delta T_{ad} = -\int_{H_0}^{H_1} \left(\frac{T}{C(T,H)}\right)_H \left(\frac{\partial M(T,H)}{\partial T}\right)_H dH$$

where T is the temperature, H is the applied magnetic field, C is the heat capacity of the working magnet (refrigerant) and M is the magnetization of the refrigerant. The temperature change in the material is caused by a change in the entropy of the material.

As used herein, the term "magnetocaloric effect" includes any phenomenon in which the temperature change of a material is caused by exposing the material to a changing magnetic field.

The magnetocaloric effect exhibited by most magnetocaloric materials is as follows: the temperature of the magnetocaloric material increases when the magnetic field is moved near or in contact with the magnetocaloric material, and wherein the temperature of the magnetocaloric material decreases when the magnetic field is moved away from the magnetocaloric material. Materials which undergo a magnetocaloric effect with application and removal of a magnetic field include, but are not limited to, Gadolinium based alloys. In some embodiments, the magnetocaloric material exhibits a magnetocaloric effect, wherein the temperature of the magnetocaloric material increases when the magnetic field is moved near or in contact with the magnetocaloric material, and wherein the temperature of the magnetocaloric material decreases when the magnetic field is moved away from the magnetocaloric material.

However, some magnetocaloric materials exhibit a inversed magnetocaloric effect, wherein the temperature of the magnetocaloric material decreases when the magnetic field is moved near or in contact with the magnetocaloric material, and wherein the temperature of the magnetocaloric material increases when the magnetic field is moved away from the magnetocaloric material. Materials which undergo an inverse magnetocaloric effect with application and removal of a magnetic field include, but are not limited to, Heusler alloys, which include, but are not limited to, NiMn based alloys. In some embodiments, the magnetocaloric material exhibits an inverse magnetocaloric effect, wherein the temperature of the magnetocaloric material decreases when the magnetic field is moved near or in contact with the magnetocaloric material, and wherein the temperature of the magnetocaloric material increases when the magnetic field is moved away from the magnetocaloric material.

Some embodiments of the present invention provide a magnetocaloric material comprising $(Ce_xNd_{1-x})Si$ wherein x is in the range of about 0.1 to about 0.9. In some embodiments, the magnetocaloric material exhibits a $2^{nd}$ order magnetic phase transition in the temperature range of about 10K to about 42K. In some embodiments, the magnetocaloric material is $Ce_{0.1}Nd_{0.9}Si_{1.0}$, $Ce_{0.2}Nd_{0.8}Si_{1.0}$, $Ce_{0.3}Nd_{0.7}Si_{1.0}$, $Ce_{0.4}Nd_{0.6}Si_{1.0}$, $Ce_{0.5}Nd_{0.5}Si_{1.0}$, $Ce_{0.6}Nd_{0.4}Si_{1.0}$, $Ce_{0.7}Nd_{0.3}Si_{1.0}$, $Ce_{0.8}Nd_{0.2}Si_{1.0}$, $Ce_{0.9}Nd_{0.1}Si_{1.0}$, or any combination thereof.

Some embodiments of the present invention provide a magnetocaloric material comprising RE $(Si_y A_{1-y})$ wherein RE is selected from the group consisting of Ce, Nd, or Gd, and wherein A is selected from the group consisting of Sn, Co, Al, Ni, Fe, Mn, Zn, or Cu, and wherein y is in the range of about 0.1 to about 0.9. In some embodiments the material is $Ce_{1.0}Si_{0.9}Sn_{0.1}$, $Ce_{1.0}Si_{0.8}Sn_{0.8}$, $Ce_{1.0}Si_{0.7}Sn_{0.3}$, $Ce_{1.0}Si_{0.6}Sn_{0.4}$, $Ce_{1.0}Si_{0.5}Sn_{0.5}$, $Ce_{1.0}Si_{0.4}Sn_{0.6}$, $Ce_{1.0}Si_{0.3}Sn_{0.7}$, $Ce_{1.0}Si_{0.2}Sn_{0.8}$, $Ce_{1.0}Si_{0.1}Sn_{0.9}$, or any combination thereof. In some embodiments the material is $Nd_{1.0}Si_{0.9}Mn_{0.1}$, $Nd_{1.0}Si_{0.8}Mn_{0.8}$, $Nd_{1.0}Si_{0.7}Mn_{0.3}$, $Nd_{1.0}Si_{0.6}Mn_{0.4}$, $Nd_{1.0}Si_{0.5}Mn_{0.5}$, $Nd_{1.0}Si_{0.4}Mn_{0.6}$, $Nd_{1.0}Si_{0.3}Mn_{0.7}$, $Nd_{1.0}Si_{0.2}Mn_{0.8}$, $Nd_{1.0}Si_{0.1}Mn_{0.9}$, or any combination thereof. In some embodiments the material is $Gd_{1.0}Si_{0.9}Mn_{0.1}$, $Gd_{1.0}Si_{0.8}Mn_{0.8}$, $Gd_{1.0}Si_{0.7}Mn_{0.3}$, $Gd_{1.0}Si_{0.6}Mn_{0.4}$, $Gd_{1.0}Si_{0.5}Mn_{0.5}$, $Gd_{1.0}Si_{0.4}Mn_{0.6}$, $Gd_{1.0}Si_{0.3}Mn_{0.7}$, $Gd_{1.0}Si_{0.2}Mn_{0.8}$, $Gd_{1.0}Si_{0.1}Mn_{0.9}$, or any combination thereof. In some embodiments the material is $Nd_{1.0}Si_{0.9}Fe_{0.1}$, $Nd_{1.0}Si_{0.8}Fe_{0.8}$, $Nd_{1.0}Si_{0.7}Fe_{0.3}$, $Nd_{1.0}Si_{0.6}Fe_{0.4}$, $Nd_{1.0}Si_{0.5}Fe_{0.5}$, $Nd_{1.0}Si_{0.4}Fe_{0.6}$, $Nd_{1.0}Si_{0.3}Fe_{0.7}$, $Nd_{1.0}Si_{0.2}Fe_{0.8}$, $Nd_{1.0}Si_{0.1}Fe_{0.9}$, or any combination thereof. In some embodiments the material is $Gd_{1.0}Si_{0.9}Fe_{0.1}$, $Gd_{1.0}Si_{0.8}Fe_{0.8}$, $Gd_{1.0}Si_{0.7}Fe_{0.3}$, $Gd_{1.0}Si_{0.6}Fe_{0.4}$, $Gd_{1.0}Si_{0.5}Fe_{0.5}$, $Gd_{1.0}Si_{0.4}Fe_{0.6}$, $Gd_{1.0}Si_{0.3}Fe_{0.7}$, $Gd_{1.0}Si_{0.2}Fe_{0.8}$, $Gd_{1.0}Si_{0.1}Fe_{0.9}$, or any combination thereof. In some embodiments the material is $Nd_{1.0}Si_{0.9}Zn_{0.1}$, $Nd_{0.1}Si_{0.8}Zn_{0.8}$, $Nd_{1.0}Si_{0.7}Zn_{0.3}$, $Nd_{1.0}Si_{0.6}Zn_{0.4}$, $Nd_{1.0}Si_{0.5}Zn_{0.5}$, $Nd_{1.0}Si_{0.4}Zn_{0.6}$, $Nd_{1.0}Si_{0.3}Zn_{0.7}$, $Nd_{1.0}Si_{0.2}Zn_{0.8}$, $Nd_{1.0}Si_{0.1}Zn_{0.9}$, or any combination thereof. In some embodiments the material is $Nd_{1.0}Si_{0.9}Ni_{0.1}$, $Nd_{1.0}Si_{0.8}Ni_{0.8}$, $Nd_{1.0}Si_{0.7}Ni_{0.3}$, $Nd_{1.0}Si_{0.6}Ni_{0.4}$, $Nd_{1.0}Si_{0.5}Ni_{0.5}$, $Nd_{1.0}Si_{0.4}Ni_{0.6}$, $Nd_{1.0}Si_{0.3}Ni_{0.7}$, $Nd_{1.0}Si_{0.2}Ni_{0.8}$, $Nd_{1.0}Si_{0.1}Ni_{0.9}$, or any combination thereof. In some embodiments the material is $Nd_{1.0}Si_{0.9}Co_{0.1}$, $Nd_{1.0}Si_{0.8}Co_{0.8}$, $Nd_{1.0}Si_{0.7}Co_{0.3}$, $Nd_{1.0}Si_{0.6}Co_{0.4}$, $Nd_{1.0}Si_{0.5c}Co_{0.5}$, $Nd_{1.0}Si_{0.4}Co_{0.6}$, $Nd_{1.0}Si_{0.3}Co_{0.7}$, $Nd_{1.0}Si_{0.2}Co_{0.8}$, $Nd_{1.0}Si_{0.1}Co_{0.9}$, or any combination thereof. In some embodiments the material is $Nd_{1.0}Si_{0.9}Cu_{0.1}$, $Nd_{1.0}Si_{0.8}Cu_{0.8}$, $Nd_{1.0}Si_{0.7}Cu_{0.3}$, $Nd_{1.0}Si_{0.6}Cu_{0.4}$, $Nd_{1.0}Si_{0.5c}Cu_{0.5}$, $Nd_{1.0}Si_{0.4}Cu_{0.6}$, $Nd_{1.0}Si_{0.3}Cu_{0.7}$, $Nd_{1.0}Si_{0.2}Cu_{0.8}$, $Nd_{1.0}Si_{0.1}Cu_{0.9}$, or any combination thereof.

Some embodiments of the present invention provide a magnetocaloric material comprising $(Ce_y Nd_{5-y}) Si_{3.0}$ wherein y is in the range of about 0.1 to about 4.9. In some embodiments, the magnetocaloric material exhibits a magnetic phase transition in the temperature range of about 40K to about 300K. In some embodiments, the magnetocaloric material is $Ce_{0.1}Nd_{4.9}Si_{3.0}$, $Ce_{0.2}Nd_{4.8}Si_{3.0}$, $Ce_{0.3}Nd_{4.7}Si_{3.0}$, $Ce_{0.4}Nd_{4.6}Si_{3.0}$, $Ce_{0.5}Nd_{4.5}Si_{3.0}$, $Ce_{0.6}Nd_{4.4}Si_{3.0}$, $Ce_{0.7}Nd_{4.3}Si_{3.0}$, $Ce_{0.8}Nd_{4.2}Si_{3.0}$, $Ce_{0.9}Nd_{4.1}Si_{3.0}$, $Ce_{1.0}Nd_{4.0}Si_{3.0}$, $Ce_{1.1}Nd_{3.9}Si_{3.0}$, $Ce_{1.2}Nd_{3.8}Si_{3.0}$, $Ce_{1.3}Nd_{3.7}Si_{3.0}$, $Ce_{1.4}Nd_{3.6}Si_{3.0}$, $Ce_{1.5}Nd_{3.5}Si_{3.0}$, $Ce_{1.6}Nd_{3.4}Si_{3.0}$, $Ce_{1.7}Nd_{3.3}Si_{3.0}$, $Ce_{1.8}Nd_{3.2}Si_{3.0}$, $Ce_{1.9}Nd_{3.1}Si_{3.0}$, $Ce_{2.0}Nd_{3.0}Si_{3.0}$, $Ce_{2.1}Nd_{2.9}Si_{3.0}$, $Ce_{2.2}Nd_{2.8}Si_{3.0}$, $Ce_{2.3}Nd_{2.7}Si_{3.0}$, $Ce_{2.4}Nd_{2.6}Si_{3.0}$, $Ce_{2.5}Nd_{2.5}Si_{3.0}$, $Ce_{2.6}Nd_{2.4}Si_{3.0}$, $Ce_{2.7}Nd_{2.3}Si_{3.0}$, $Ce_{2.8}Nd_{2.2}Si_{3.0}$, $Ce_{2.9}Nd_{2.1}Si_{3.0}$, $Ce_{3.0}Nd_{2.0}Si_{3.0}$, $Ce_{3.1}Nd_{1.9}Si_{3.0}$, $Ce_{3.2}Nd_{1.8}Si_{3.0}$, $Ce_{3.3}Nd_{1.7}Si_{3.0}$, $Ce_{3.4}Nd_{1.6}Si_{3.0}$, $Ce_{3.5}Nd_{1.5}Si_{3.0}$, $Ce_{3.6}Nd_{1.4}Si_{3.0}$, $Ce_{3.7}Nd_{1.3}Si_{3.0}$, $Ce_{3.8}Nd_{1.2}Si_{3.0}$, $Ce_{3.9}Nd_{1.1}Si_{3.0}$, $Ce_{4.1}Nd_{1.0}Si_{3.0}$, $Ce_{4.1}Nd_{0.9}Si_{3.0}$, $Ce_{4.2}Nd_{0.8}Si_{3.0}$, $Ce_{4.3}Nd_{0.7}Si_{3.0}$, $Ce_{4.4}Nd_{0.6}Si_{3.0}$, $Ce_{4.5}Nd_{0.5}Si_{3.0}$, $Ce_{4.6}Nd_{0.4}Si_{3.0}$, $Ce_{4.7}Nd_{0.3}Si_{3.0}$, $Ce_{4.8}Nd_{0.2}Si_{3.0}$, $Ce_{4.9}Nd_{0.1}Si_{3.0}$, or any combination thereof.

Some embodiments of the present invention provide a magnetocaloric material comprising Nd $(Si_y A_{1-y})$ wherein A is selected from the group consisting of Sn, Co, Al, Ni, Fe, Mn, Zn, or Cu, and wherein y is in the range of about 0.1 to about 0.9. In some embodiments, the magnetocaloric material is $Nd_{1.0}Si_{0.9}Sn_{0.1}$, $Nd_{1.0}Si_{0.8}Sn_{0.8}$, $Nd_{1.0}Si_{0.7}Sn_{0.3}$, $Nd_{1.0}Si_{0.6}Sn_{0.4}$, $Nd_{1.0}Si_{0.5}Sn_{0.5}$, $Nd_{1.0}Si_{0.4}Sn_{0.6}$, $Nd_{1.0}Si_{0.3}Sn_{0.7}$, $Nd_{1.0}Si_{0.2}Sn_{0.8}$, $Nd_{1.0}Si_{0.1}Sn_{0.9}$, or any combination thereof. In some embodiments, the magnetocaloric material is $Nd_{1.0}Si_{0.9}Co_{0.1}$, $Nd_{1.0}Si_{0.8}Co_{0.8}$, $Nd_{1.0}Si_{0.7}Co_{0.3}$, $Nd_{1.0}Si_{0.6}Co_{0.4}$, $Nd_{1.0}Si_{0.5}Co_{0.5}$, $Nd_{1.0}Si_{0.4}Co_{0.6}$, $Nd_{1.0}Si_{0.3}Co_{0.7}$, $Nd_{1.0}Si_{0.2}Co_{0.8}$, $Nd_{1.0}Si_{0.1}Co_{0.9}$, or any combination thereof. In some embodiments, the magnetocaloric material is $Nd_{1.0}Si_{0.9}Cu_{0.1}$, $Nd_{1.0}Si_{0.8}Cu_{0.8}$, $Nd_{1.0}Si_{0.7}Cu_{0.3}$, $Nd_{1.0}Si_{0.6}Cu_{0.4}$, $Nd_{1.0}Si_{0.5}Cu_{0.5}$, $Nd_{1.0}Si_{0.4}Cu_{0.6}$, $Nd_{1.0}Si_{0.3}Cu_{0.7}$, $Nd_{1.0}Si_{0.2}Cu_{0.8}$, $Nd_{1.0}Si_{0.1}Cu_{0.9}$, or any combination thereof.

Some embodiments of the present invention provide a magnetocaloric material comprising $Nd_{5.0}$ $(Si_z D_{3-z})$ wherein D is selected from the group consisting of Sn, Co, Al, Ni, Fe, Mn, Zn, or Cu, and wherein z is in the range of about 0.1 to about 2.9. In some embodiments, the magnetocaloric material exhibits a $2^{nd}$ order magnetic phase transition in the temperature range of about 40K to about 300K. In some embodiments, the magnetocaloric material comprises $Nd_{5.0}$ $(Si_z Sn_{3-z})$ wherein z is in the range of about 0.1 to about 2.9. In some embodiments, the magnetocaloric material is $Nd_{5.0}Si_{0.1}Sn_{2.9}$, $Nd_{5.0}Si_{0.2}Sn_{2.8}$, $Nd_{5.0}Si_{0.3}Sn_{2.7}$, $Nd_{5.0}Si_{0.4}Sn_{2.6}$, $Nd_{5.0}Si_{0.5}Sn_{2.5}$, $Nd_{5.0}Si_{0.6}Sn_{2.4}$, $Nd_{5.0}Si_{0.7}Sn_{2.3}$, $Nd_{5.0}Si_{0.8}Sn_{2.2}$, $Nd_{5.0}Si_{0.9}Sn_{2.1}$, $Nd_{5.0}Si_{1.0}Sn_{2.0}$, $Nd_{5.0}Si_{1.1}Sn_{1.9}$, $Nd_{5.0}Si_{1.2}Sn_{1.8}$, $Nd_{5.0}Si_{1.3}Sn_{1.7}$, $Nd_{5.0}Si_{1.4}Sn_{1.6}$, $Nd_{5.0}Si_{1.5}Sn_{1.5}$, $Nd_{5.0}Si_{1.6}Sn_{1.4}$, $Nd_{5.0}Si_{1.7}Sn_{1.3}$, $Nd_{5.0}Si_{1.8}Sn_{1.2}$, $Nd_{5.0}Si_{1.9}Sn_{1.1}$, $Nd_{5.0}Si_{2.0}Sn_{1.0}$, $Nd_{5.0}Si_{2.1}Sn_{0.9}$, $Nd_{5.0}Si_{2.2}Sn_{0.8}$, $Nd_{5.0}Si_{2.3}Sn_{0.7}$, $Nd_{5.0}Si_{2.4}Sn_{0.6}$, $Nd_{5.0}Si_{2.5}Sn_{0.5}$, $Nd_{5.0}Si_{2.6}Sn_{0.4}$, $Nd_{5.0}Si_{2.7}Sn_{0.3}$, $Nd_{5.0}Si_{2.8}Sn_{0.2}$, $Nd_{5.0}Si_{2.9}Sn_{0.1}$, or any combination thereof.

In some embodiments, the magnetocaloric material comprises nano-grains, wherein at least one dimension of the nano-grains is in the range of about 0.1 nm to about 1000 nm. In some embodiments of the magnetocaloric material, the at least one dimension of the nanograins is in the range of about 1 nm to about 100 nm. In some embodiments of the magnetocaloric material, the at least one dimension of the nanograins is in the range of about 1 nm to about 50 nm.

Another embodiment of the invention is a magnetic refrigerator comprising the magnetocaloric material. In some embodiments, a magnetic refrigerator comprises a magnetocaloric material, wherein the magnetocaloric material comprises $(Ce_x Nd_{1-x})Si$ wherein x is in the range of about 0.1 to about 0.9. In some embodiments, a magnetic refrigerator comprises a magnetocaloric material, wherein the magnetocaloric material comprises $(Ce_y Nd_{5-y}) Si_{3.0}$ wherein y is in the range of about 0.1 to about 4.9. In some embodiments, a magnetic refrigerator comprises a magnetocaloric material, wherein the magnetocaloric material comprises Nd $(Si_y A_{1-y})$ wherein A is selected from the group consisting of Sn, Co, Al, Ni, Fe, Mn, Zn, or Cu, and wherein x is in the range of about 0.1 to about 0.9. In some embodiments, a magnetic refrigerator comprises a magnetocaloric material, wherein the magnetocaloric material comprises $Nd_{5.0}$ $(Si_z D_{3-z})$ wherein D is selected from the group consisting of Sn, Co, Al, Ni, Fe, Mn, Zn or Cu, and wherein z is in the range of about 0.1 to about 2.9.

Another embodiment of the invention is a method of manufacturing a heat pump, comprising fabricating at least one part of the heat pump from a magnetocaloric material. In some embodiments, a method of manufacturing a heat pump comprises fabricating at least one part of the heat pump from a magnetocaloric material, wherein the magnetocaloric material comprises $(Ce_x Nd_{1-x})Si$ wherein x is in the range of about 0.1 to about 0.9. In some embodiments, a method of manufacturing a heat pump comprises fabricating at least one part of the heat pump from a magnetocaloric material, wherein the magnetocaloric material comprises $(Ce_y Nd_{5-y}) Si_{3.0}$ wherein y is in the range of about 0.1 to about 4.9. In some embodiments, a method of manufacturing a heat pump comprises fabricating at least one part of the heat pump from a magnetocaloric material, wherein the magnetocaloric material comprises Nd $(Si_y A_{1-y})$ wherein A is selected from the group consisting of Sn, Co, Al, Ni, Fe, Mn, or Cu, and wherein x is in the range of about 0.1 to about 0.9. In some embodiments, a method of manufacturing a heat pump comprises fabricating at least one part of the heat pump from a magnetocaloric material, wherein the magnetocaloric material comprises $Nd_{5.0}$ $(Si_z D_{3-z})$ wherein D is selected from the group consisting of Sn, Co, Al, Ni, Fe, Mn, or Cu, and wherein z is in the range of about 0.1 to about 2.9.

In some embodiments, the nanograins of the magnetocaloric material are synthesized by methods known in the art, such as, but not limited to, spark erosion, ball milling, hydrothermal method, chemical precipitation synthesis, arc melting, chemical vapor deposition, physical vapor deposition, etc. In some embodiments, the nanograined manganese based magnetocaloric material is synthesized using a spark erosion technique.

In some embodiments, the nano-grained magnetocaloric material is formed into a pellet structure by various methods known in the art, such as sintering, hydraulic pressing, swaging, hot pressing, or any other method which effectively packs powder material into solid pellet form. In some embodiments, the magnetocaloric material may be formed into a porous structure.

R. D. McMichael, J. J. Ritter, and R. D. Shull, *J. Appl. Phys.*, 73, (10) 6946 (1993), showed that the addition of iron nanoparticles to gadolinium-gallium composites increases the magnetocaloric response by a factor of 3-4, which may be due to a local field amplification effect. Therefore, incorporation of iron and/or its composites into the magnetocaloric material may act to locally amplify the magnetic field in the material, and further enhance the magnetocaloric response of the material. In some embodiments, the magnetocaloric material further comprises iron or any material, composite, or alloy comprising iron. In some embodiments the magnetocaloric material comprises nanoparticles of iron or nanoparticles of any material, composite, or alloy comprising iron. In some embodiments, the magnetocaloric pellets further comprise iron or any material, composite, or alloy comprising iron.

In some embodiments the magnetocaloric material comprises nanograins. In some embodiments, at least one dimension of the nanograins is in the range of about 0.1 nm to about 1000 nm. In some embodiments, at least one dimension of the nanograins is in the range of about 1 nm to about 500 nm. In some embodiments, at least one dimension of the nanograins is in the range of about 20 nm to about 100 nm. In some embodiments, at least one dimension of the nanograins is in the range of about 100 nm to about 200 nm. In some embodiments, at least one dimension of the nanograins is in the range of about 1 nm to about 75 nm. In some embodiments, at least one dimension of the nanograins is in the range of about 5 nm to about 20 nm. In some embodiments, at least one dimension of the nanograins is in the range of about 1 nm to about 100 nm. In some embodiments, the at least one dimension of the nanograins is in the range of about 1 nm to about 50 nm.

The response temperature of the magnetocaloric material may be adjusted with small changes in the composition of the material. In some embodiments, the response temperature of the magnetocaloric material is adjusted by changing the composition of the material. In some embodiments, the magnetocaloric material exhibits a magnetocaloric effect at any temperature in the range of about 1K to about 350K. In some embodiments, the magnetocaloric material exhibits a magnetocaloric effect at any temperature in the range of about 10K to about 50K. In some embodiments, the magnetocaloric material exhibits a magnetocaloric effect at any temperature in the range of about 50K to about 1000K. In some embodiments, the magnetocaloric material exhibits a magnetocaloric effect at any temperature in the range of about 100K to about 350K. In some embodiments, the magnetocaloric material exhibits a magnetocaloric effect at any temperature in the range of about 50K to about 200K. In some embodiments, the magnetocaloric nanomaterial exhibits a magnetocaloric effect at any temperature in the range of about 10K to about 80K.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed example embodiments which follow.

EXAMPLES

The embodiments will be explained with respect to preferred embodiments which are not intended to limit the present invention. Further, in the present disclosure where conditions and/or structures are not specified, the skilled artisan in the art can readily provide such conditions and/or structures, in light of the teachings herein, as a matter of routine experimentation.

The object of this current invention is to provide magnetocaloric materials useful for magnetic refrigeration applications.

Example 1

Figure 2:
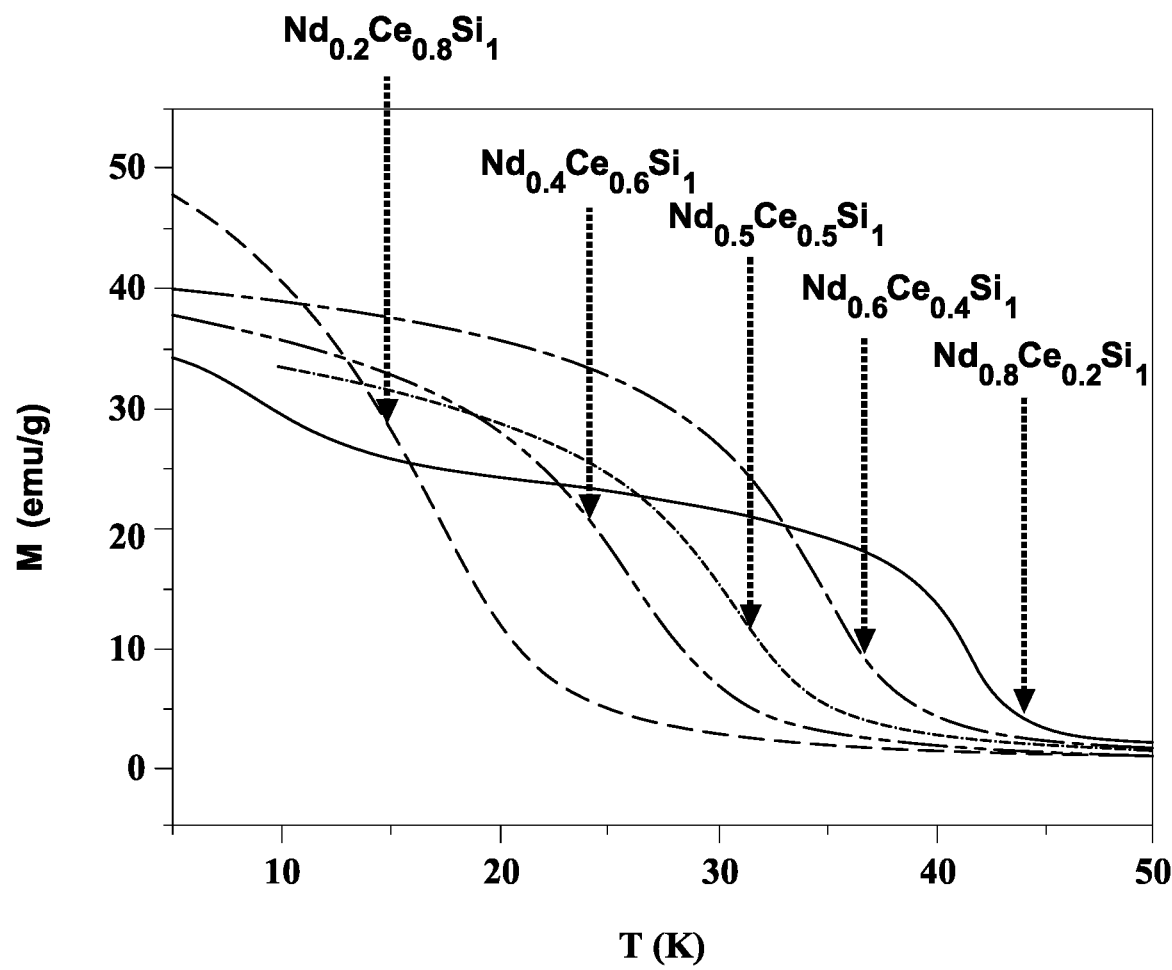
FIG. 2 illustrates the magnetization versus temperature for several CeNdSi alloy's.

A $Nd_{0.5}Ce_{0.5}Si_{1.0}$ ingot was prepared by arc melting in an argon atmosphere. The ingot was sealed in a quartz tube furnace under argon and annealed at 950 C for 2 weeks. FIG. 1 shows the DS vs entropy and FIG. 2 shows the magnetization versus temperature for the $Nd_{0.5}Ce_{0.5}Si_{1.0}$ alloy with $2^{nd}$ order phase transition occurring near 32K.

Example 2

A $Nd_{0.2}Ce_{0.8}Si_{1.0}$ ingot was prepared by arc melting in an argon atmosphere. The ingot was sealed in a quartz tube furnace under argon and annealed at 950 C for 2 weeks. FIG. 2 shows the magnetization versus temperature for the $Nd_{0.2}Ce_{0.8}Si_{1.0}$ alloy with $2^{nd}$ order phase transition occurring near 15K.

Example 3

A $Nd_{0.4}Ce_{0.6}Si_{1.0}$ ingot was prepared by arc melting in an argon atmosphere. The ingot was sealed in a quartz tube furnace under argon and annealed at 950 C for 2 weeks. FIG. 2 shows the magnetization versus temperature for the $Nd_{0.4}Ce_{0.6}Si_{1.0}$ alloy with $2^{nd}$ order phase transition occurring near 25K.

Example 4

A $Nd_{0.6}Ce_{0.4}Si_{1.0}$ ingot was prepared by arc melting in an argon atmosphere. The ingot was sealed in a quartz tube furnace under argon and annealed at 950 C for 2 weeks. FIG. 2 shows the magnetization versus temperature for the $Nd_{0.6}Ce_{0.4}Si_{1.0}$ alloy with $2^{nd}$ order phase transition occurring near 36K.

Example 5

A $Nd_{0.8}Ce_{0.2}Si_{1.0}$ ingot was prepared by arc melting in an argon atmosphere. The ingot was sealed in a quartz tube furnace under argon and annealed at 950 C for 2 weeks. FIG. 2 shows the magnetization versus temperature for the $Nd_{0.8}Ce_{0.2}Si_{1.0}$ alloy with $2^{nd}$ order phase transition occurring near 42K.

Example 6

Figure 3:
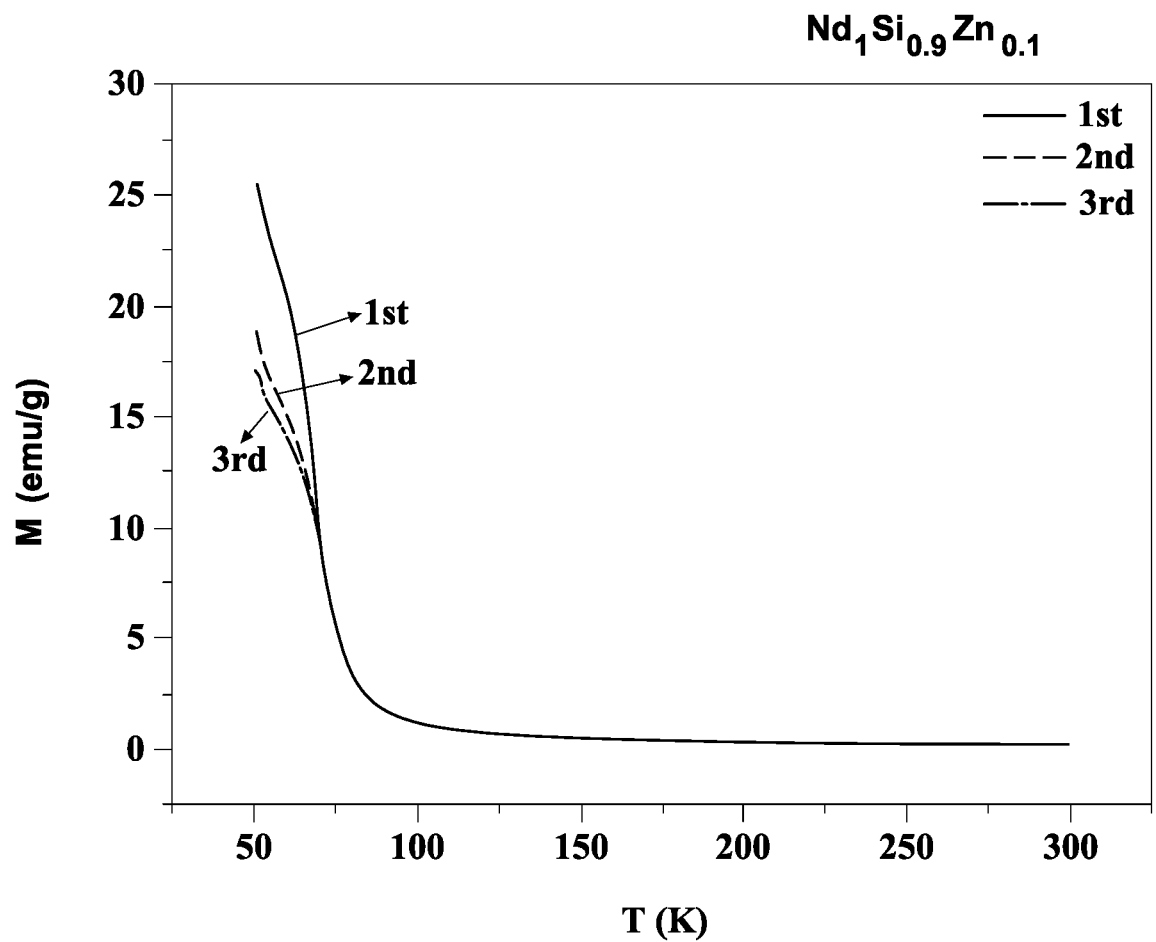
FIG. 3 illustrates the magnetization versus temperature for a $Nd_{1.0}Si_{0.9}Zn_{0.1}$ alloy.

A $Nd_{1.0}Si_{0.9}Zn_{0.1}$ ingot was prepared by arc melting in an argon atmosphere. FIG. 3 shows the magnetization versus temperature for the $Nd_{1.0}Si_{0.9}Zn_{0.1}$ alloy with $2^{nd}$ order phase transition occurring near 75K.

Example 6

Figure 4:
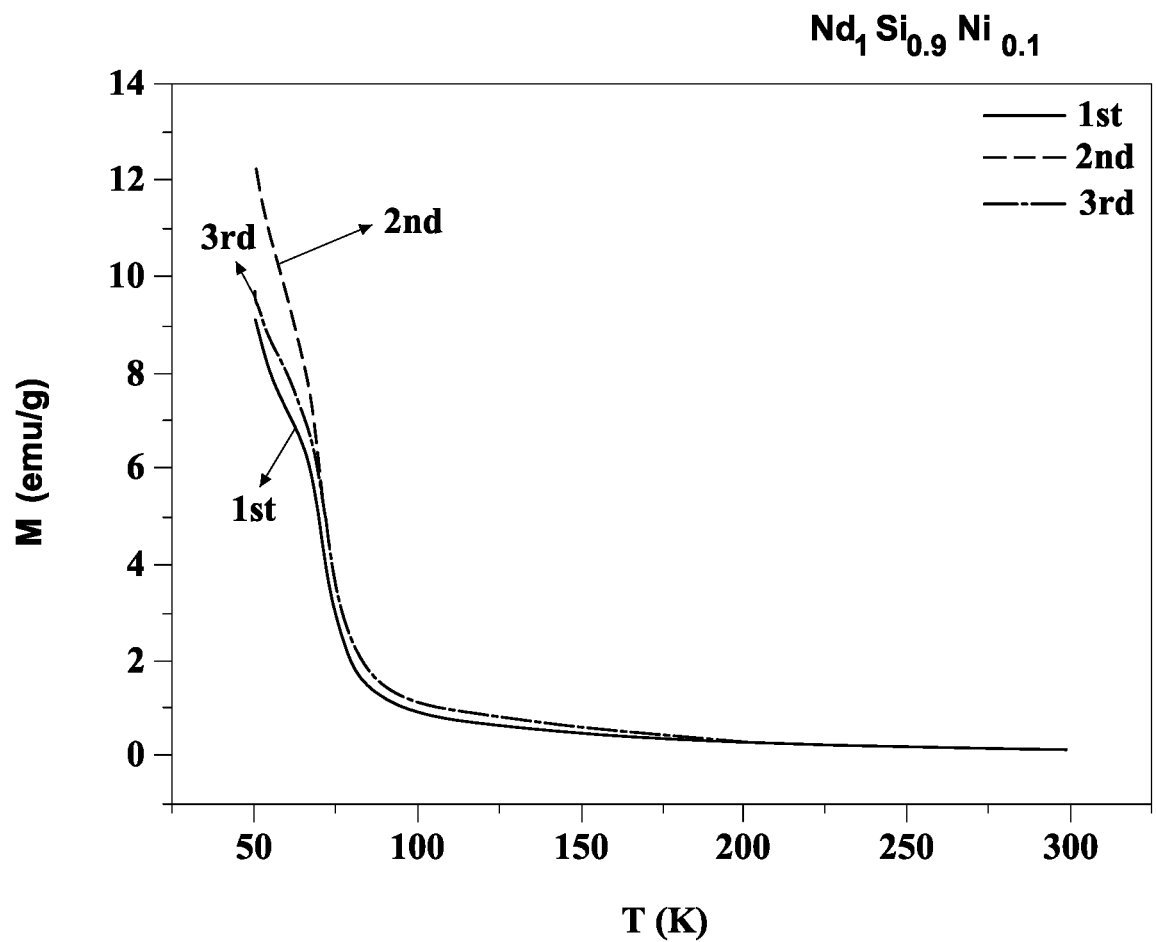
FIG. 4 illustrates the magnetization versus temperature for a $Nd_{1.0}Si_{0.9}Ni_{0.1}$ alloy.

A $Nd_{1.0}Si_{0.9}Ni_{0.1}$ ingot was prepared by arc melting in an argon atmosphere. FIG. 4 shows the magnetization versus temperature for the $Nd_{1.0}Si_{0.9}Ni_{0.1}$ alloy with $2^{nd}$ order phase transition occurring near 75K.

Example 7

Figure 5:
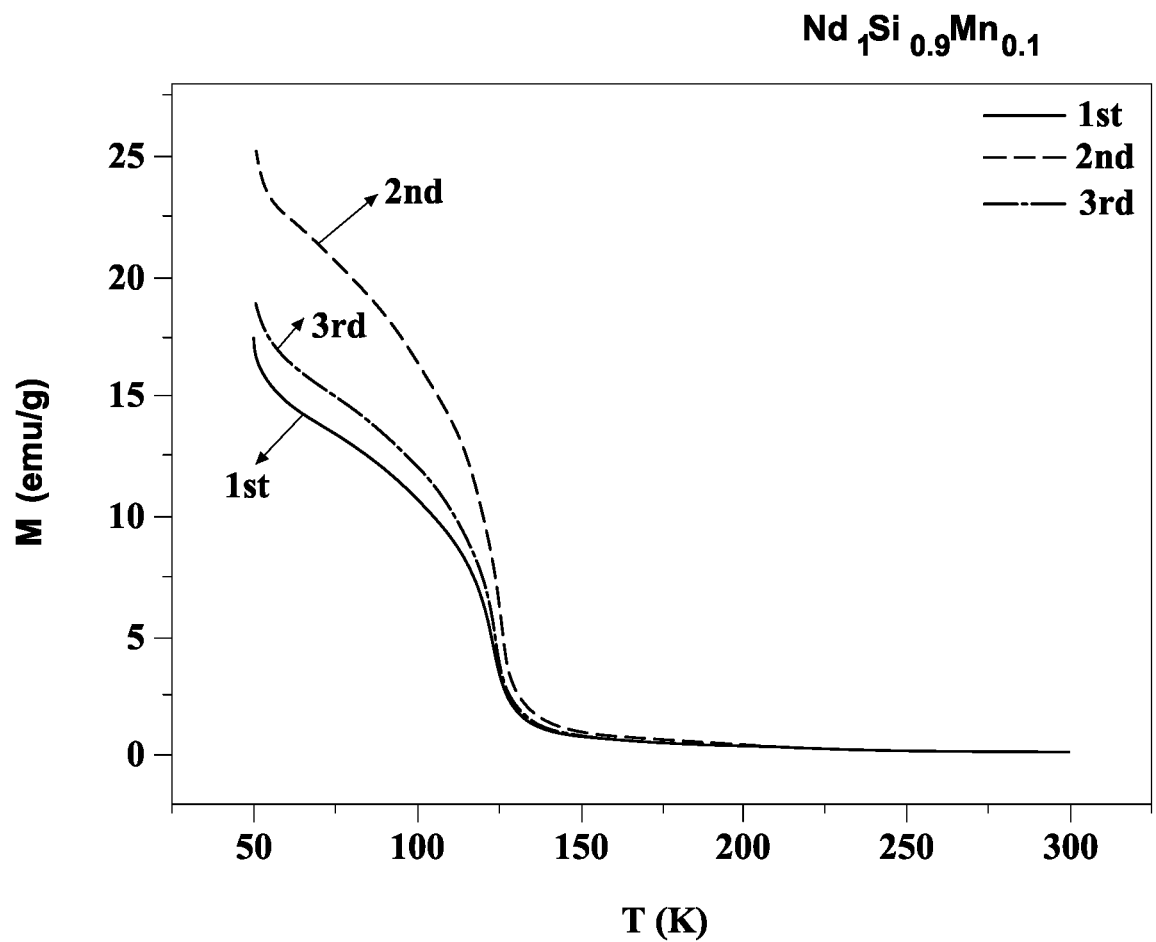
FIG. 5 illustrates the magnetization versus temperature for a $Nd_{1.0}Si_{0.9}Mn_{0.1}$ alloy.

A $Nd_{1.0}Si_{0.9}Mn_{0.1}$ ingot was prepared by arc melting in an argon atmosphere. FIG. 5 shows the magnetization versus temperature for the $Nd_{1.0}Si_{0.9}Mn_{0.1}$ alloy with $2^{nd}$ order phase transition occurring near 125K.

Example 8

Figure 6:
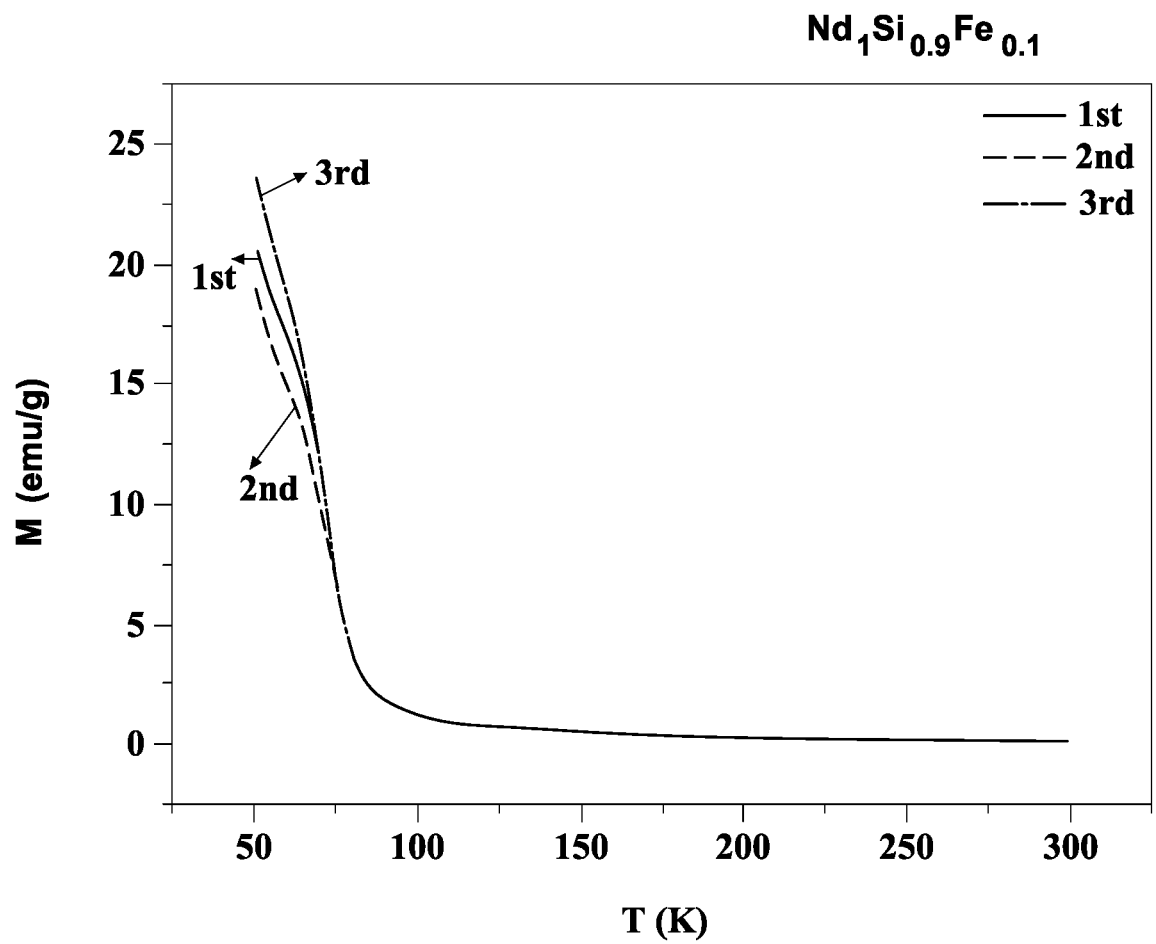
FIG. 6 illustrates the magnetization versus temperature for a $Nd_{1.0}Si_{0.9}Fe_{0.1}$ alloy.

A $Nd_{1.0}Si_{0.9}Fe_{0.1}$ ingot was prepared by arc melting in an argon atmosphere. FIG. 6 shows the magnetization versus temperature for the $Nd_{1.0}Si_{0.9}Fe_{0.1}$ alloy with $2^{nd}$ order phase transition occurring near 75K.

Example 9

Figure 7:
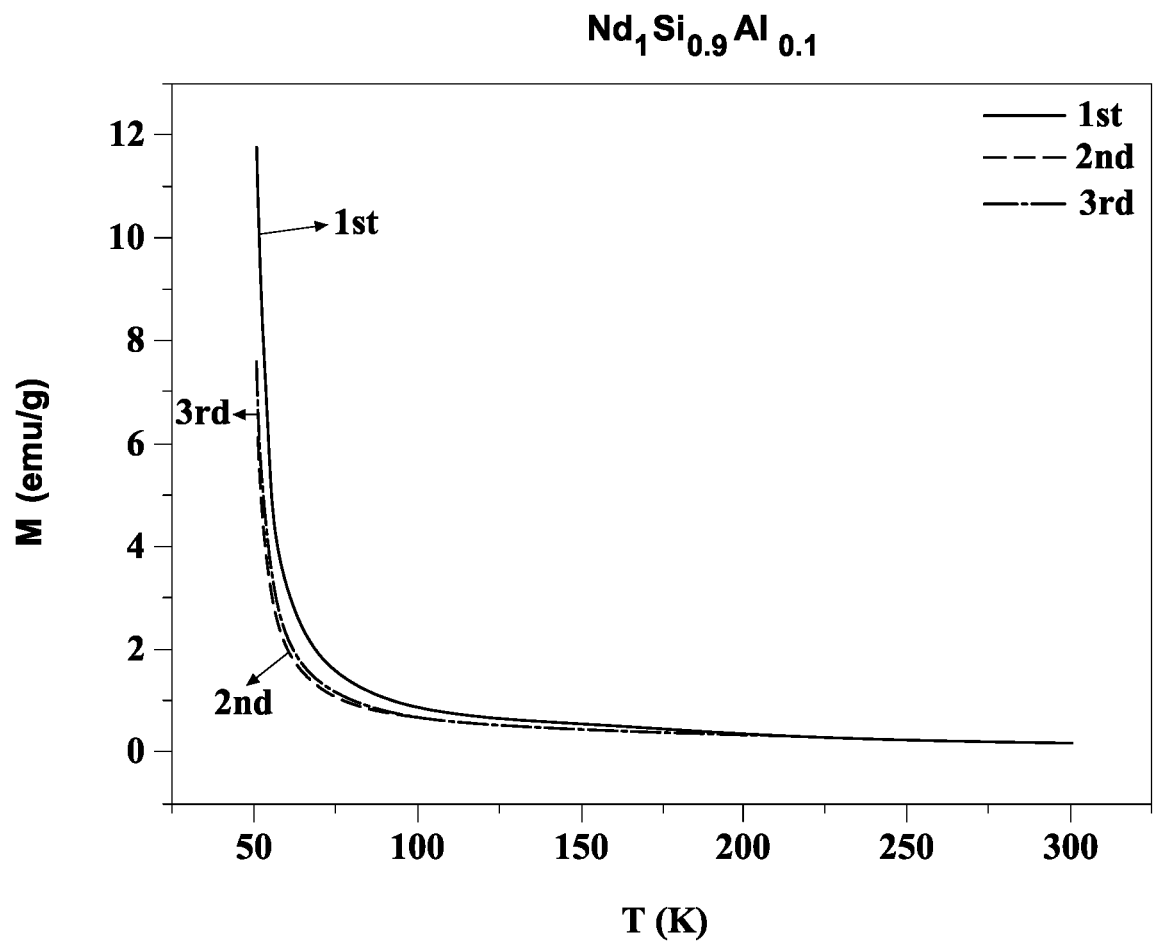
FIG. 7 illustrates the magnetization versus temperature for a $Nd_{1.0}Si_{0.9}Al_{0.1}$ alloy.

A $Nd_{1.0}Si_{0.9}Al_{0.1}$ ingot was prepared by arc melting in an argon atmosphere. FIG. 7 shows the magnetization versus temperature for the $Nd_{1.0}Si_{0.9}Al_{0.1}$ alloy with $2^{nd}$ order phase transition occurring less than 50K.

Example 10

Figure 8:
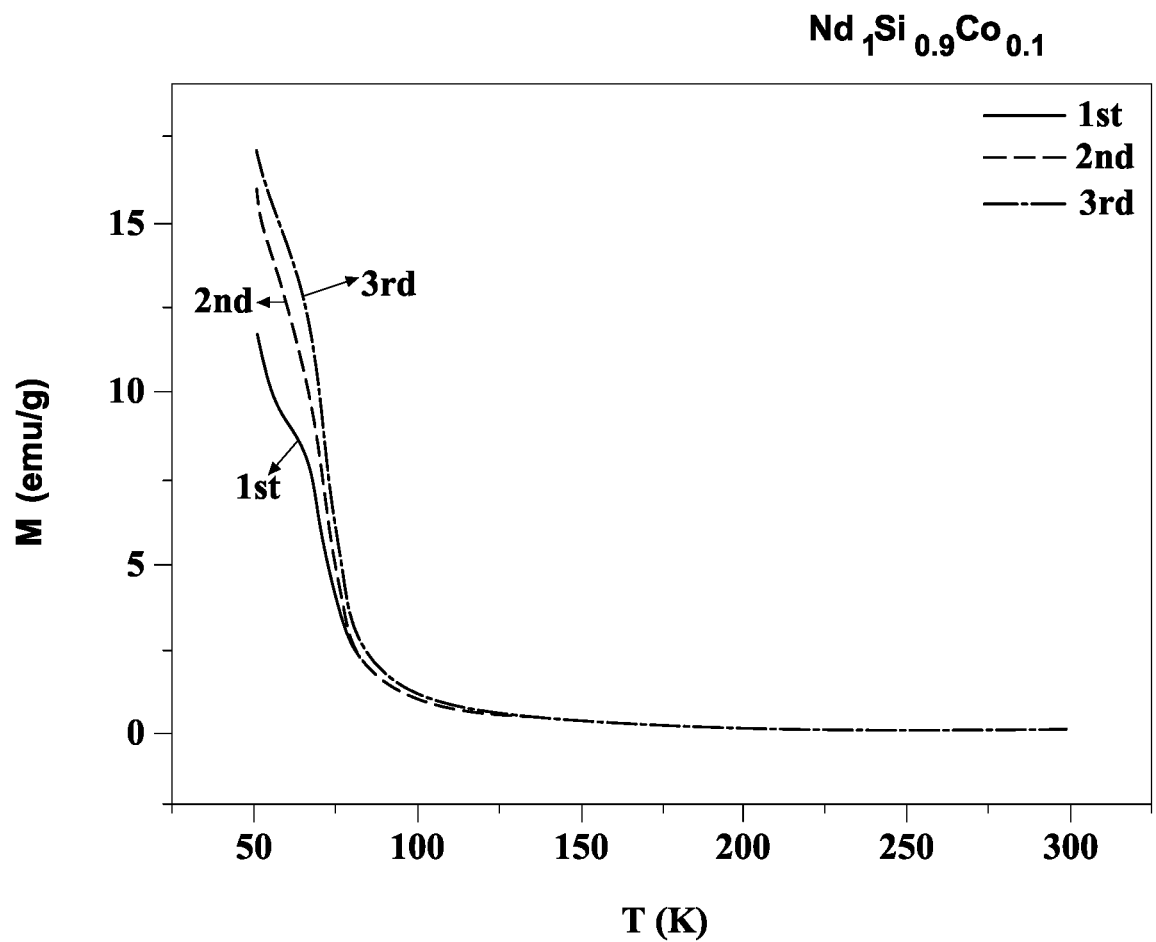
FIG. 8 illustrates the magnetization versus temperature for a $Nd_{1.0}Si_{0.9}Co_{0.1}$ alloy.

A $Nd_{1.0}Si_{0.9}Co_{0.1}$ ingot was prepared by arc melting in an argon atmosphere. FIG. 8 shows the magnetization versus temperature for the $Nd_{1.0}Si_{0.9}Co_{0.1}$ alloy with $2^{nd}$ order phase transition occurring near 75K.

Example 11

Figure 9:
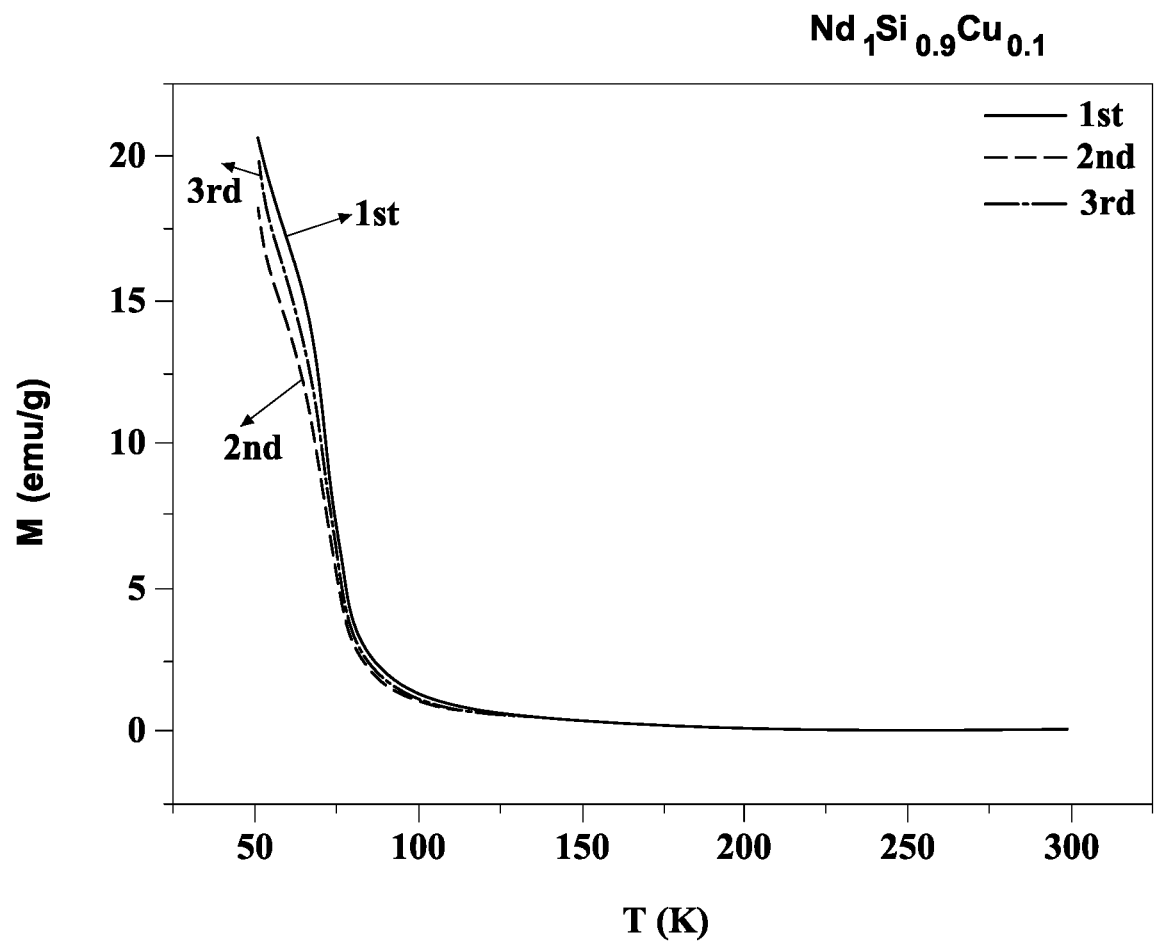
FIG. 9 illustrates the magnetization versus temperature for a $Nd_{1.0}Si_{0.9}Cu_{0.1}$ alloy.

A $Nd_{1.0}Si_{0.9}Cu_{0.1}$ ingot was prepared by arc melting in an argon atmosphere. FIG. 9 shows the magnetization versus temperature for the $Nd_{1.0}Si_{0.9}Cu_{0.1}$ alloy with $2^{nd}$ order phase transition occurring near 75K.

Example 12

Figure 10:
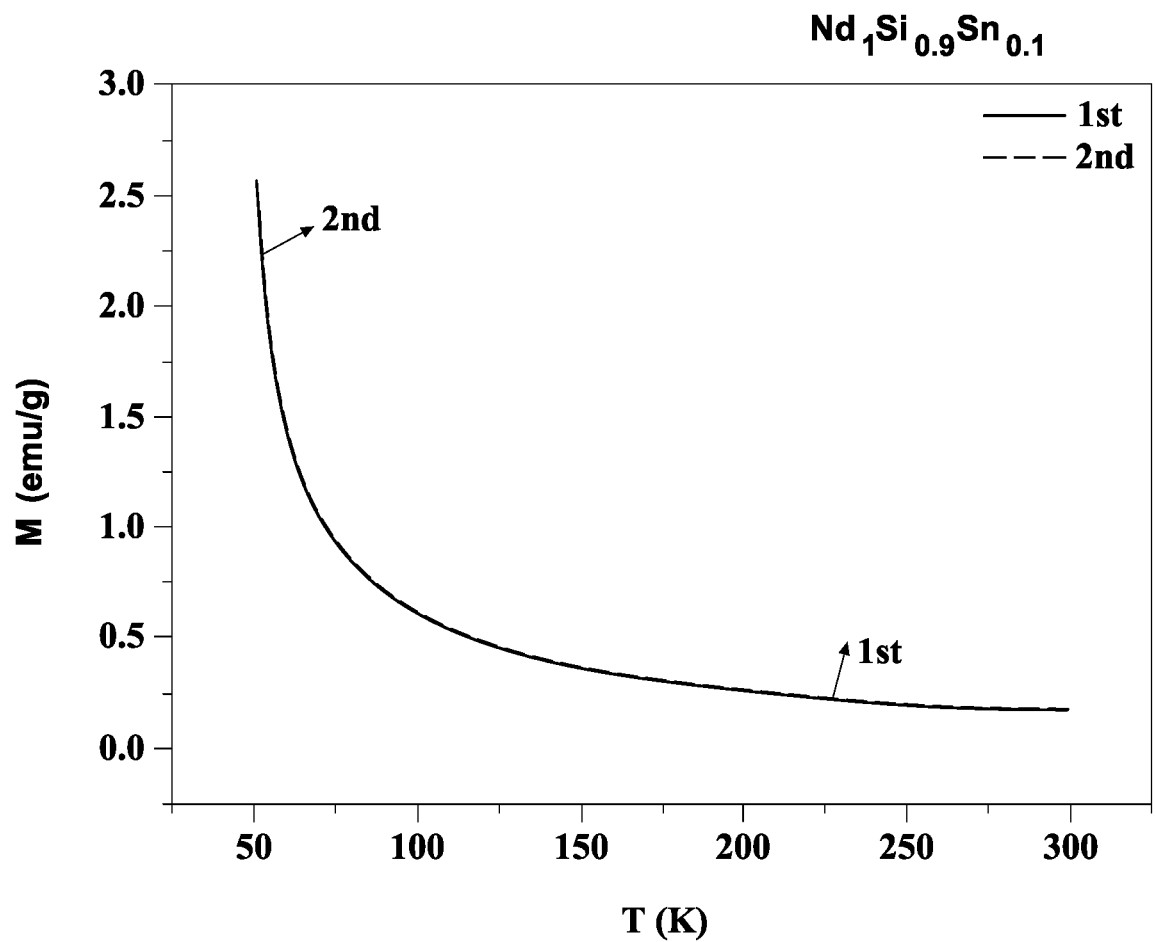
FIG. 10 illustrates the magnetization versus temperature for a $Nd_{1.0}Si_{0.9}Sn_{0.1}$ alloy.

A $Nd_{1.0}Si_{0.9}Sn_{0.1}$ ingot was prepared by arc melting in an argon atmosphere. FIG. 10 shows the magnetization versus temperature for the $Nd_{1.0}Si_{0.9}Sn_{0.1}$ alloy with $2^{nd}$ order phase transition occurring less than 50K.

Example 13

An example magnetic refrigerator comprising the disclosed magnetocaloric material is made by the following steps 1) preparing the magnetocaloric material into thin plates or millimeter sized spherical balls, 2) placing the magnetocaloric material into a magnetic field, where the application of the magnetic field causes the material to heat up, 3) using a heat transfer fluid to remove the heat from the magnetocaloric material, 4) then removing the magnetic field causing the magnetocaloric material to cool down, 5) then exposing the cold magnetocaloric material to the desired refrigeration environment where heat from the refrigeration environment is transferred to the magnetocaloric material, 6) then repeating steps 1 to 5 to create a refrigeration cycle which maintains a desired cold temperature within the refrigeration environment.

Example 14

An example magnetic refrigerator comprising the disclosed magnetocaloric material is made by the following similar steps as in Example 13, except that a heat transfer fluid is used in step 5 to expose the cold magnetocaloric material to the desired refrigeration environment, where the heat from the refrigeration environment is transferred to the heat transfer fluid.

Example 15

An example heat pump comprising fabricating at least one part of the heat pump from a magnetocaloric material is made by incorporating at least one magnetocaloric material of the disclosed invention, at least one permanent magnet, and at least one mechanical movement system; wherein the magnetic field generated by the permanent magnet enables the magnetocaloric effect of the magnetocaloric material when at least one oscillation cycle is performed by the mechanical movement system, wherein a change in temperature of the magnetocaloric material occurs when the magnetocaloric material is moved into or out of a magnetic field; and wherein the mechanical movement system performs the at least one oscillation cycle by physically moving the permanent magnet, the magnetocaloric material, a magnet shielding material, or any combination thereof; and wherein the at least one oscillation cycle comprises exposing the magnetic field to the magnetocaloric material at a predefined magnetic field ramp-up speed, holding the magnetic field near or in contact with the magnetocaloric material for a specified contact holding time, removing the magnetic field from the magnetocaloric material at a predefined ramp-down speed, and holding the magnetic field away from the magnetocaloric material for a specified removed holding time; and wherein the at least one oscillation cycle is optimized to provide cooling on one side of the heat pump device.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein. It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. A magnetocaloric material comprising:

$(Ce_xNd_{1-x})Si$ wherein x is in the range of about 0.1 to about 0.9, and wherein the magnetocaloric material exhibits a $2^{nd}$ order magnetic phase transition in the temperature range of about 10K to about 42K.

2. The magnetocaloric material of claim 1, wherein the material is $Ce_{0.1}Nd_{0.9}Si_{1.0}$, $Ce_{0.2}Nd_{0.8}Si_{1.0}$, $Ce_{0.3}Nd_{0.7}Si_{1.0}$, $Ce_{0.4}Nd_{0.6}Si_{1.0}$, $Ce_{0.5}Nd_{0.5}Si_{1.0}$, $Ce_{0.6}Nd_{0.4}Si_{1.0}$, $Ce_{0.7}Nd_{0.3}Si_{1.0}$, $Ce_{0.8}Nd_{0.2}Si_{1.0}$, $Ce_{0.9}Nd_{0.1}Si_{1.0}$, or any combination thereof.

3. The magnetocaloric material of claim 1, wherein the material comprises nano-grains, wherein at least one dimension of the nano-grains is in the range of about 0.1 nm to about 1000 nm.

4. A magnetic refrigerator, comprising the magnetocaloric material of claim 1.

5. A method of manufacturing a heat pump, comprising fabricating at least one part of the heat pump from the material of claim 1.

* * * * *